United States Patent [19]
Goto et al.

[11] 3,936,722
[45] Feb. 3, 1976

[54] FIELD EXCITATION CONTROL SYSTEM FOR THE SYNCHRONOUS GENERATOR

[75] Inventors: Masuo Goto; Akira Isono, both of Hitachi, Japan

[73] Assignee: Hitachi, Ltd., Japan

[22] Filed: Apr. 3, 1974

[21] Appl. No.: 457,506

[30] Foreign Application Priority Data
Apr. 4, 1973 Japan.................................. 48-37773

[52] U.S. Cl. ...................... 322/20; 322/22; 322/28; 322/29
[51] Int. Cl.² ........................................... H02P 9/14
[58] Field of Search ............ 322/17, 19, 20, 24, 25, 322/28, 29, 32

[56] References Cited
UNITED STATES PATENTS
3,058,050  10/1962  Eggeling .......................... 322/25 X
3,195,032  7/1965  Shonnard et al................... 322/19 X
3,391,329  7/1968  Meyer................................... 322/20

OTHER PUBLICATIONS
"Concepts of Synchronous Machine Stability as Affected by Excitation Control", Demello et al., IEEE Transactions on Power Apparatus and Systems, Vol. PAS 88, No. 4, April 1969.

*Primary Examiner*—R. N. Envall, Jr.
*Assistant Examiner*—Robert J. Hickey
*Attorney, Agent, or Firm*—Craig & Antonelli

[57] ABSTRACT

The field excitation flux of the synchronous generator is controlled in response to the summing rotor angle signal of a predetermined set signal and of a rotor angle signal representing a phase difference between the voltage equivalent to an infinite bus voltage and the output voltage from the pilot generator provided on the same rotating shaft as the synchronous generator.

6 Claims, 10 Drawing Figures

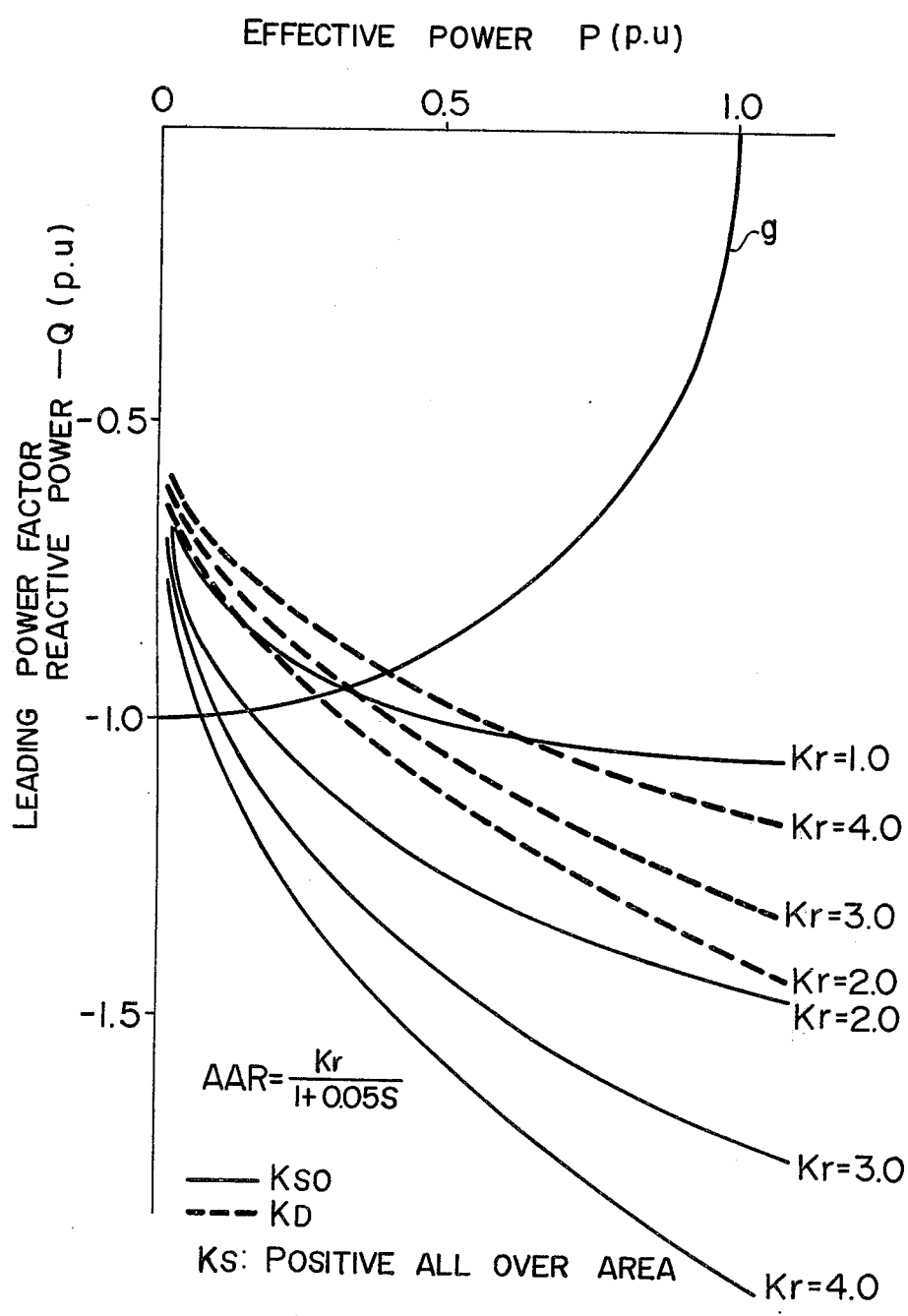

FIELD EXCITATION CONTROL SYSTEM FOR THE SYNCHRONOUS GENERATOR

BACKGROUND OF THE INVENTION

1. Field of the Invention

The present invention relates to a field excitation control system of the synchronous generator and, particularly, to that of the synchronous generator capable of supplying leading power factor reactive power with large capacity.

2. Description of the Prior Art

Generally, the synchronous generator employs a field excitation control system by which the field excitation flux (the field excitation current) is controlled so that the terminal voltage of the synchronous generator may be kept constant. More specifically, in the light of the fact that the increment of the field excitation flux is followed by the rise of the terminal voltage of the generator, the terminal voltage is fed back and compared with a predetermined set voltage, and the terminal voltage thereof is controlled in response to the difference generated by the comparison operation, so as to keep it constant. The field excitation control system designed so as to control the terminal voltage of the synchronous generator to be constant is called Automatic Voltage Regulator (AVR). An "AVR operation" to be used in this specification means the state in which the generator operates under the control by the AVR.

In recent cities, underground cable lines are finding increased utilization when laying down the transmission and distribution lines from the standpoint of restriction of the site and efforts to keep up an appearance of the streets. In this case, the capacitance is a problem in the power supply, the capacitance being formed between the cable and ground. That is, when the load is measured across the generator terminals, it takes the appearance of the leading power factor load. Accordingly, such cable lines have a tendancy to absorb the leading power factor reactive power. As a result, the generator connected to such cable lines is required to perform the condensive operation for supplying the leading power factor reactive power to the cable lines. However, in case the synchronous generator under control of the AVR, operates taking the leading power factor load, the increment of the leading power factor load is followed by the increment of the rotor angle of the synchronous generator, thus resulting in unstable operation thereof when the leading power factor load is increased. Therefore, the synchronous generator is given a restriction in increasing its compensative reactive power supply, when considering the stability of the generator operation. When the generator is operated supplying the reactive power exceeding such restriction, it is disturbed into stepping out of the system in the operation. In the future, it is anticipated there will be a greater increase in the employment of the underground cable lines. Thus, the need will increase for a new synchronous generator capable of stably supplying the sufficiently large reactive power in question even to the leading power factor load with a largest capacity. That the condensive operation, in particular in the light load region, tends to be restricted is inevitable, so far as the AVR is employed for the field excitation control system. This will be described in detail later.

SUMMARY OF THE INVENTION

Thus, an object of the present invention is to provide a novel field excitation control system suitable for supplying the leading power factor reactive power.

Another object of the present invention is to provide a field excitation control system capable of supplying a larger leading power factor reactive power when the power output of the generator is very small.

A further object of the present invention is to provide a field excitation control system capable of continuing a stable operation even when a larger leading power factor resistive power is supplied.

A field excitation control system according to the present invention uses the rotor angle of the generator as its input signal, unlike that of the prior art, and controls the field excitation flux (the field excitation current) of the synchronous generator by using the summing signal of a predetermined rotor angle signal and of the rotor angle signal fed to the input of the generator.

Other objects and features of the present invention will become apparent from the following description when taken in connection with the accompanying drawings.

BRIEF DESCRIPTION OF THE DRAWING

FIG. 5 is an output characteristic curves depicted with the results from analyzing the block diagram of FIG. 3 with respect to the threshold permitting the generator using the automatic angle regulator to operate stably.

DESCRIPTION OF THE PREFERRED EMBODIMENT

A field excitation control system for the synchronous generator of the invention controls the rotor angle of the generator so as to be constant, and is of the automatic angle regulator (AAR), not of the automatic voltage regulator (AVR). As is well known, the rotor angle is the phase difference between the internal induced electromotive force of the synchronous generator and voltage across any terminal of the electric power system.

Any terminal referred here may be either the output terminal of the generator or the terminal of the infinite bus.

Figure 1:
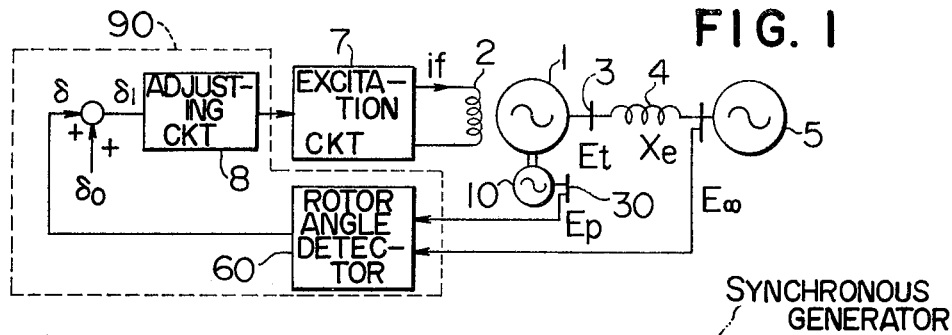
FIG. 1 is a block schematic diagram illustrating a synchronous generator provided with an automatic angle regulator and its associated electric power system.

The state in which the field excitation of the generator is controlled by means of the AAR will be referred to as an AAR operation. Referring to FIG. 1, there is shown a schematic block diagram of the generator in the AAR operation and its associated electrical power system. In the figure, the reference numeral 90 designates the AAR which has two input signals; one is the output voltage Ep from a pilot generator 10 directly connected to the rotating shaft of a generator 1 and the other is the terminal voltage E∞ of the electrical power system. An output terminal of the pilot generator 10 is designated by 30. A rotor angle detector 60 is for detecting the rotor angle $\delta$ between both the signals Ep and E∞. An excitation current $i_f$ of a field windings 2 is controlled through an adjusting circuit 8 and an excitation circuit 7 by a summing signal $\delta_1$ of a reference rotor angle $\delta_0$ and the rotor angle $\delta$ from the rotor angle detector 60. The rotor angle $\delta$ signal is used as a positive feedback signal in the AAR 90. Thus, the difference of the AAR from the AVR resides only in that the former uses the rotor angle $\delta$ signal as the positive feedback signal. Although the rotor angle $\delta$ is obtained on the basis of the output voltage Ep of the pilot generator the terminal voltage E∞ of the electrical power system in this case shown in FIG. 1, an ideal way to obtain the rotor angle $\delta$ is to use terminal voltage Ep and a generator terminal voltage Et. In the figure, the reference numeral 4 represents a transmission line, and Xe is a reactance of the transmission line 4.

A next explanation will be made of the fact that the AAR is stably operable over a broader range of the leading power factor operation in comparison with the AVR, using the transfer function of the synchronous generator.

Figure 2:
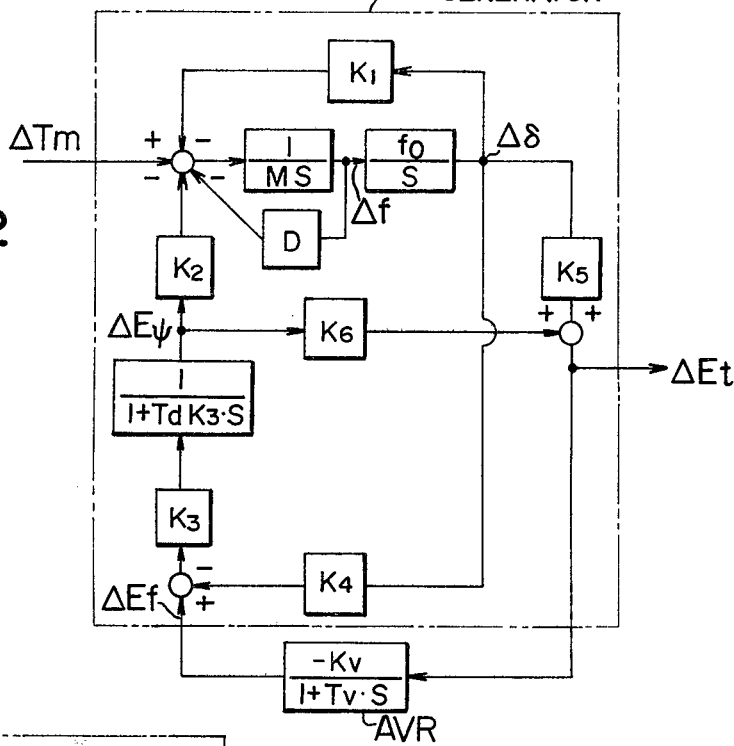
FIG. 2 is a block diagram representing the linearized characteristic of the synchronous generator using the automatic voltage regulator.
Figure 3:
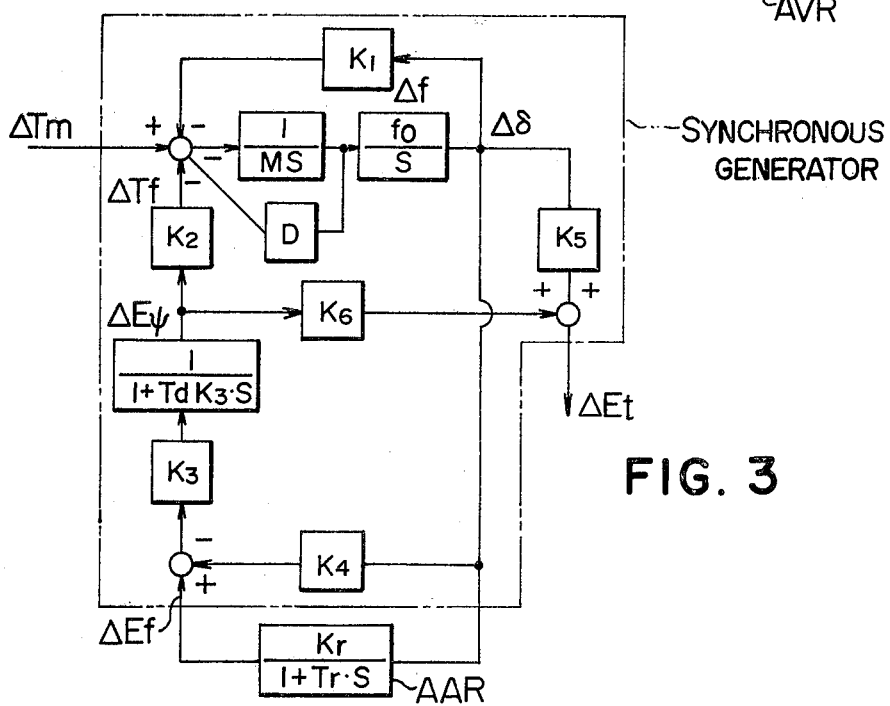
FIG. 3 is a block diagram representing the linearized characteristic of the synchronous generator using the automatic angle regulator.

FIGS. 2 and 3 are the block diagrams representing the characteristic of the synchronous generator in terms of the transfer functions, which are depicted by analyzing the function of the synchronous generator through the method discussed in the article concerning the stability of the synchronous machines disclosed in the literature of "IEEE Transactions PAS VOL. PAS-88. No. 4. P. 316–329". The block diagram in FIG. 2 is for the case employing the AVR while the block diagram in FIG. 3 for the case employing the AAR according to the present invention. In FIGS. 2 and 3, the part enclosed with a dot-dash-line represents the characteristics of the synchronous generators per se. The block in FIG. 3 representing the transfer function of the AAR of $$\frac{Kr}{1 + TrS}$$

serves to control the change (variation) of the field excitation $\Delta Ef$ of the synchronous generator in response to the input thereto of the change of the rotor angle $\Delta\delta$, and forms a positive feedback loop. The block of $$\frac{-Kv}{1 + TvS}$$

in FIG. 2 representing the transfer function of the AVR forms a negative feedback loop, the input of which is the change of the generator terminal voltage $\Delta Et$. The designations of the reference characters employed in FIGS. 2 and 3 are as follows; The symbol $\Delta$ followed by the respective characters indicates a change in the value of the respective character variables, the $s$ found in the blocks is the Laplace operator, the Tm is the disturbance mechanically applied to the synchronous generator 1, the $f$ is the speed of the rotating rotor of the generator, the $\delta$ is the rotor angle, the Et is the terminal voltage of the synchronous generator, the Ef is the exciting voltage applied to the field winding through the AVR or the AAR, and the E$\phi$ is a field flux linkage. In the characters used together with the respective transfer functions, the M designates an inertia constant of the generator rotor, the $f_o$ is a reference speed of the rotating rotor, the D a damping coefficient, Td is a time constant of the field winding when the armature winding is opened, and $K_1 \sim K_6$ designate predetermined coefficients. Those coefficients $K_1 \sim K_6$ found in FIGS. 2 and 3 are calculated by means of the equations to be described below.

$K_1$ is given by the equation $K_1 = (\Delta T/\Delta\delta)E\phi = $ constant. That is, the $K_1$ indicates the change $\Delta T$ in the value of the electrical torque T with respect to the change $\Delta\delta$ of the rotor angle when the field flux linkage E$\phi$ of the direct axis (hereinafter abbreiviated to as $d$-axis) of the synchronous motor is kept constant. Then electrical torque generated acts so as to cancel the mechanical torque Tm in the variation thereof, although this will be described in detail later. In FIGS. 2 and 3, the sum of the outputs of the blocks $K_1$ and $K_2$, and the block D representing the damping coefficient applied to the rotor of the generator is the electrical torque opposite to the mechanical torque Tm.

The $K_2$ is given by the equation, $K_2 = (\Delta T/\Delta\delta) \delta = $ constant. That is, $K_2$ means the change $\Delta T$ of the electrical torque with respect to the change $\Delta E\phi$ of the $d$-axis flux linkage when the rotor angle $\delta$ is constant.

$K_3$ indicates the ratio of the synchronous impedance of the generator at its transient condition to that at its steady-state condition when the external impedance (the impedance of the transmission line) is composed of only the reactance component.

The $K_4$ is obtained through the equation, $K_4 = (\Delta Et/\Delta\delta)_{E\phi} = $ constant. This coefficient indicates the ratio of the change $\Delta Et$ of the terminal voltage Et to the change $\Delta\delta$ of the rotor angle $\delta$, when the rotor angle $\delta$ is constant.

The $K_6$ is obtained by the expression $K_6 = (\Delta Et/\Delta E\phi)\delta = $ constant. This coefficient shows the ratio of the change $\Delta Et$ of the terminal voltage Et to the change $\Delta E\phi$ when the rotor angle $\delta$ is constant.

The block diagrams shown in FIGS. 2 and 3 are called linearized block diagrams. More precisely, those block diagrams are obtained through linearization made on the operation of the synchronous generator in the operating condition thereof approximate to such an operating condition that a single synchronous generator, as shown in FIG. 1, is connected through the external reactance Xe to the large power system 5.

Assume that the swing occuring to the rotor of the synchronous machine in FIGS. 2 and 3 belongs to the second-order oscillatory system (the system comprising the block 1/Ms and the block $f_o/s$). In such case, the electrical torque T (the sum of the outputs from the blocks of $K_1$, $K_2$, and D) which reacts upon the mechanical torque Tm of the rotor may be resolved into its synchronizing torque components Ts and the damping torque component $T_D$. The synchronizing torque component $T_S$ is the torque component in phase with the change $\Delta\delta$ of the rotor angle $\delta$ when the rotor swings while the damping torque component $T_D$ is the torque component in phase with the change $\Delta f$ of the rotor speed $f$ when the rotor swings. In FIGS. 2 and 3, the synchronizing torque component Ts is expressed in terms of $K_1 \Delta\delta$ while the damping torque component $T_D$ in terms of $D\Delta f$. The electrical torque T acting to the rotor is created not only by the change $\Delta\delta$ of the rotor angle $\delta$ and the change $\Delta f$ of the rotor speed $f$, but also the change $\Delta E\phi$ of the field flux linkage $E\phi$. A consideration will next be made the torque Tf created by the change $\Delta E\phi$ of the field flux linkage $E\phi$. Here $\Delta Tf$ is used to designate the change the torque caused by the change $\Delta E\phi$ of the field flux linkage $E\phi$. The torque Tf depends on the field flux linkage $E\phi$ and the latter also depends on the change $\Delta\delta$ of the rotor angle $\delta$. Accordingly, the torque change $\Delta Tf$ may be the function of the rotor angle change $\Delta\delta$. Thus, the torque change Tf may be expressed $$\Delta Tf = Gf(s) \cdot \Delta\delta \qquad (1)$$

where $Gf(s)$ is a transfer function. The transfer function $Gf(s)$ of the AVR obtained from FIG. 2 is $$Gf(s) = \frac{-\frac{K_2 \cdot K_3}{1 + Ta \cdot S}\left(K_4 + \frac{K_5 \cdot Kv}{1 + Tv S}\right)}{1 + \frac{K_3 \cdot K_6}{1 + Ta \cdot S} \cdot \frac{Kv}{1 + Tv \cdot S}} \qquad (2)$$

The transfer function $Gf(s)$ of the AAR obtained from FIG. 3 is $$Gf(s) = \frac{K_2 \cdot K_3}{1 + Ta \cdot S}\left(\frac{Kr}{1 + Tr \cdot S} - K_4\right) \qquad (3)$$

Those equations (2) and (3) hold with an understanding that the transfer functions of the AVR and the AAR, as shown in FIGS. 2 and 3, are those of the first order lag circuit including the factors of time constants Tv and Tr, and gains Kv and Kr. In FIGS. 2 and 3, $Ta = K_3 Td$. In FIG. 1, the expression Gf(s) describes the change $\Delta Tf$ of the electrical torque Tf with respect to the change rotor angle change $\Delta\delta$ in terms of the Laplace operation $s$. The Laplace operator s may be expressed by $J\omega$, i.e. $s = j\omega$, where $\omega$ is an angular frequency of the rotor swing. Here, substituting back to the equation (1) with this $j\omega$.

$$\Delta Tf = [Re\{Gf(j\omega)\} + jIm\{Gf(j\omega)\}] \Delta\delta \qquad (4)$$

where Re is a real part, and Im is an imagenary part.

Figure 4:
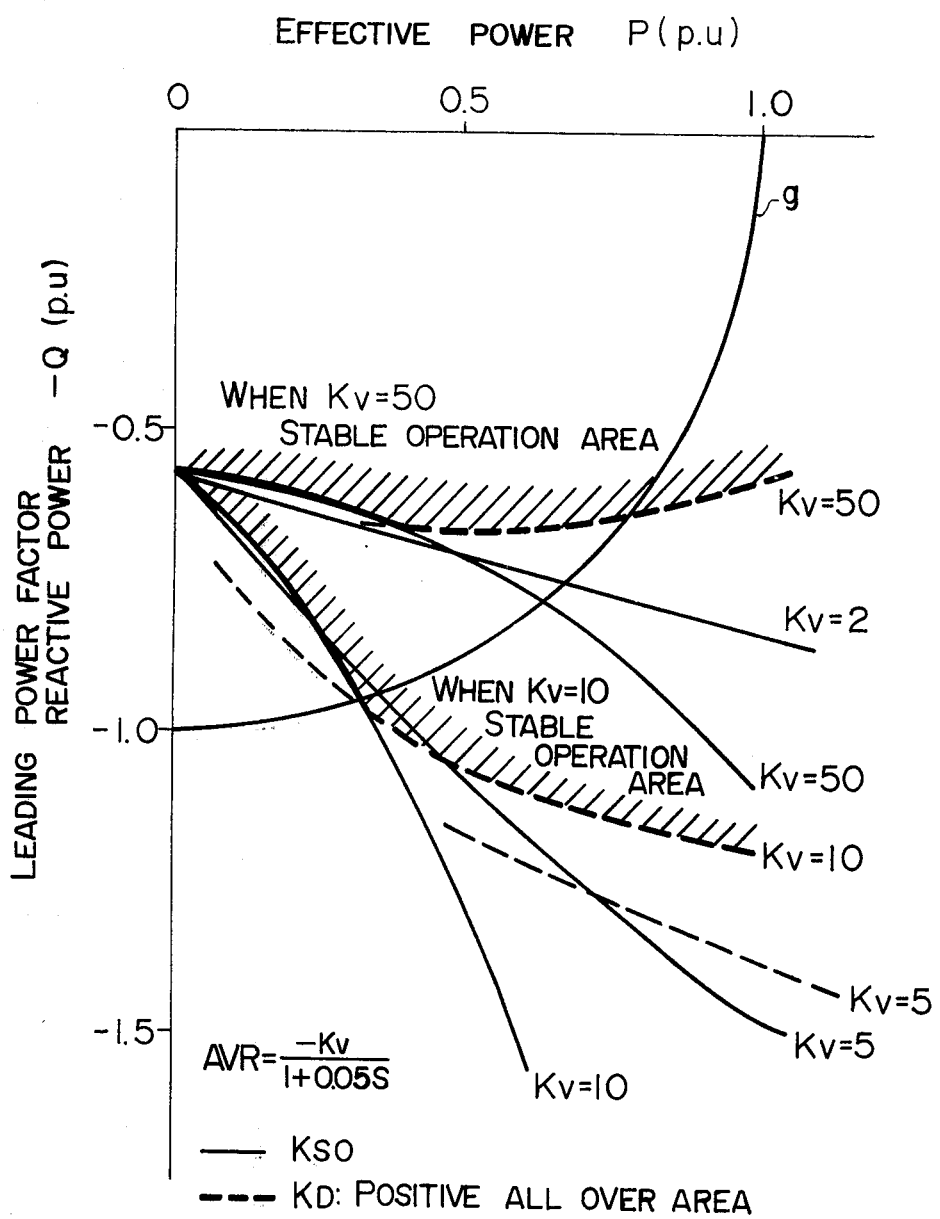
FIG. 4 is an output characteristic curves of the synchronous generator using automatic voltage regulator depicted with the results from analyzing the block diagram of FIG. 2 with respect to the threshold permitting the generator to operate with stability.

The block of $f_o/S$ found in FIGS. 3 and 4 has the following relation between its input and its output $$\Delta\delta = \frac{f_o}{j\omega}\Delta f \qquad (5)$$

By substituting the equation (5) into the equation (4), we can obtain $$\Delta Tf = Re\{Gf(j\omega)\} + \frac{f_o}{\omega}Im\{Gf(j\omega)\}\Delta f \qquad (6)$$

In the equation (6), the first term of the real part is in phase with the rotor angle change $\Delta\delta$, and indicates the synchronizing torque Ts of the above described electrical torque T while the second term of the imaginary part is in phase with the speed change $\Delta f$, and indicates the damping torque $T_D$.

Thus, a coefficient Ks (hereinafter referred to as a synchronizing torque coefficient) representing the sum of the synchronizing torques of the electrical torque acting in opposition to the mechanical torque $\Delta Tm$ is given $$Ks = K_1 + Re\{Gf(j\omega)\} \qquad (7)$$

A coefficient $K_D$ representing the sum of the damping torques of the electrical torque (hereinafter referred to as a damping torque coefficient) is given $$K_D = D + \frac{f_o}{\omega}Im\{Gf(j\omega)\} \qquad (8)$$

The synchronizing torque coefficient Ks means the ratio of the synchronizing torque change $\Delta Ts$ to the rotor angle torque $\Delta\delta$, i.e. $\Delta Ts/\Delta\delta$. On the other hand, the damping torque $K_D$ means the ratio of the damping torque change $\Delta T_D$ to the speed change $\Delta f$, i.e. $\Delta T_D/\Delta f$.

The operating stability of the synchronous generator under transient conditions thereof is determined by those coefficients Ks and $K_D$ which act in opposition to the mechanical torque $\Delta Tm$ applied to the generator under transient conditions. Regarding to the operating stability of the synchronous generator under the steady-state conditions, reference must be made to the following equation (9)

$$Kso = K_1 + Gf(0) \qquad (9)$$

where Kso is the synchronizing torque coefficient under the steady-state conditions, and is obtained with the relation $\omega = 0$. Thus, the operating stability of the synchronizing generator depends upon those coefficients Ks, $K_D$, and Kso.

For securing the stable operation of the synchronous generator, the transiently changing rotor angle $\delta$ is required to converge to a value with time. All of these coefficients Ks, $K_D$, and Kso should be positive in order to satisfy this requisition.

From the equation (2) representing the transfer function Gf(s) when the generator operates under control of the AVR, we can obtain $$Ks = K_1 - \frac{K_2K_3\{K_4 + K_5KV + K_3K_4K_5K_6Kv + K_3K_5K_6(Kv)^2 + \omega^2(K_4(Tv)^2 - K_5KvTaTv)\}}{(1 + K_3K_6Kv - \omega^2TaTv)^2 + \omega^2(Ta + Tv)} \qquad (10)$$

$$K_D = \frac{f_oK_2K_3(K_4Ta + K_5KvTa + T_5KvTv - K_3K_4K_6KvTv + \omega^2K_4(Tv)^2Ta)}{(1 + K_3K_6Kv - \omega^2TaTv)^2 + \omega^2(Ta + Tv)} \qquad (11)$$

$$Kso = K_1 - \frac{K_2K_3(K_4 + K_5Kv)}{1 + K_3K_6Kv} \qquad (12)$$

Those equations (10), (11), and (12) show that those coefficients Ks, $K_D$, and Kso depends on the time constant Tv and the gain Kv.

Similarly, from the equation (3) representing the transfer function Gf(s) when the generator operates under the control of the AAR, we can obtain $$Ks = K_1 - \frac{K_2 K_3}{1 + (\omega Ta)^2} \left\{ K_4 - \frac{Kr(1 - \omega^2 TrTa)}{1 + (\omega Ta)^2} \right\} \quad (13)$$

$$K_D = D + \frac{f_o K_2 K_3}{1 + (\omega Ta)^2} \left\{ K_4 Ta - \frac{Kr(Tr + Ta)}{1 + (\omega Ta)^2} \right\} \quad (14)$$

$$Kso = K_1 - K_2 K_3 (K_4 - Kr) \quad (15)$$

Those equations (13), (14), and (15) show that those coefficients Ks, $K_D$, and Kso are influenced by the gain Kr and the time constant Tr of the AAR.

The coefficients $K_1$ to $K_6$ in FIGS. (2) and (3) whose respective significances have been described, may also be expressed in terms of the impedance and the like of the generator, as in the equations (16) to (21) to be described below. The effective power output P and the reactive power output Q of the generator may be described in term of the impedance and the like of the generator. Accordingly, the coefficients Ks, $K_D$, and Kso in the expressions (10) to (15) may be described as a function of the effective power output P and the reactive power output Q. That is to say, the variations of those coefficients Ks, $K_D$, and Kso is permitted to be drawn on the output characteristic diagram of the generator (in which the effective power output P is plotted along the axis of abscissas and the reactive power output is plotted along the axis of ordinates).

$$K_1 = \frac{Xq - Xq'}{Xc + Xd'} Iq_o E_\infty \sin \delta_o + \frac{E_Q E_\infty \cos \delta_o}{Xe + Xq} \quad (16)$$

$$K_2 = \frac{E_\infty \sin \delta_o}{Xe + Xd'} \quad (17)$$

$$K_3 = \frac{Xd' + Xe}{Xd + Xe} \quad (18)$$

$$K_4 = \frac{Xd - Xd'}{Xe + Xd'} E_\infty \sin \delta_o \quad (19)$$

$$K_5 = \frac{Xq}{Xe + Xq} \cdot \frac{Etdo}{Eto} E_\infty \cos \delta_o - \frac{Xd'}{Xe + Xd'} \cdot \frac{Etqo}{Eto} E_\infty \sin \delta_o \quad (20)$$

$$K_6 = \frac{Xe}{Xe + Xd'} \cdot \frac{Etqo}{Eto} \quad (21)$$

$$P = \frac{E_Q E_\infty}{Xe + Xq} \sin \delta_o \quad (22)$$

$$Q = \frac{E_Q E_\infty \cos \delta_o - E_\infty^2}{Xe + Xq} \quad (23)$$

where the subscript o attached to the letters Iq, δ, Et, Etq, and Etd means the values designated by those letters under the steady-state conditions, X is an impedance or reactance, Xe is the impedance of the transmission line, Xd is a direct axis reactance, Xq is a quadrature axis reactance, Xd′ is a static direct transient reactance, Xq′ is a static quadrature transient reactance, Etd is the direct axis component of the terminal voltage Et of the generator, Etq is the quadrature axis component of the terminal voltage Et, $E_Q$ is an internal induced electromotive force, and Iq is the quadrature axis current of the generator.

In FIG. 4, there is shown a diagram for illustrating various thresholds permitting the electrical coefficients Ks, $K_D$, and Kso to be positive when the gain Kv and the time constant Tr of the AVR are changed under the AVR operation of a model synchronous generator, in which the various threshold curves are plotted on the generator output characteristic diagram. In other words, in view of the fact that the electrical coefficients Ks, $K_D$, and Kso, the coefficients $K_1$ to $K_6$, and the generator power outputs P and Q are expressed by the equations (10) to (12), (16) to (21), and (22) and (23), respectively, the threshold characteristic curves permitting the electrical coefficients Ks, $K_D$, and Kso to be positive are plotted on the generator output characteristic diagram by means of the respective coefficients of the generator. In FIG. 4, the axis of abscissas indicates the variation of the effective power output P while the axis of ordinates the variation of the condensive reactive power factor −Q. Those output power P and Q are scaled with the percent unit. In the figure, the threshold curves of the coefficient Kso are drawn with the solid lines while the threshold curves of the coefficient $K_D$ are drawn with the dotted lines, and the upper area above the threshold curves is the positive area to allow the coefficients to be positive while the lower area under the threshold curves is the negative area. The coefficient Ks is impossible to depict in this figure in due to the fact that it takes a positive sign over the whole area. Accordingly, taking only the coefficients Kso and $K_D$ into account will be enough to obtain the stable operation of the generator. That is, it will suffice to seek only the positive area permitting the coefficients Kso and $K_D$ to be positive. Those threshold characteristic lines are plotted by varying the gain Kv of the AVR with the AVR of the first order time lag circuit and the time constant thereof of 0.05 seconds. Now consider the content of the diagram of FIG. 4. With regard to the threshold curves of the coefficient $K_D$ of the dotted line, it can be seen that, as the gain Kv of the AVR increases, the leading power factor area in which the stable operation of the generator is possible, becomes narrow. On the other hand, with respect to the coefficient Kso shown by the solid line, there is a specific value in the gain Kv to maximize the stable operating area of the generator, i.e. any value except the specific value brings about reduction of the stable operating area. As a consequence, it is necessary to take the gain Kv into account in order to obtain the area in which both the coefficients Kso and $K_D$ are positive as large as possible. The relation of the coefficients Kso and $K_D$ to the gain Kv is as mentioned above. The heavy lines show the area in which both the coefficients Kso and $K_D$ are positive with a state that the gain Kv is kept constant. It can be seen from the heavy line indication that there is such an inclination that the stable operating area is determined by the coefficient Kso when the effective power output P is small while it is determined by the coefficient $K_D$ when the P is large. Finally, consider the leading power factor operation of the AVR. In this condition, the gain Kv has an optimum gain, as the gain is related to the coefficient Kso, as described above. As a result, there is a limitation when it is attempted to broaden the leading power factor operating area by adjusting the gain of the AVR. This is the reason why the synchronous generator employing the AVR is inadequate to the leading power factor operation. Curve g shows the maximum output of the generator defined in accordance with the input thereof, therefor it is impossible to drive the generator in the area under the curve g.

The diagram in FIG. 5 is drawn in accordance with the similar concept applied when the diagram in FIG. 4 is drawn. The first order time lag element is employed for the AAR as in the case of the AVR and the time constant Tr is the same as the time constant Tv of the AVR. From this figure, it is seen that when the gain of the AAR is increased, the area permitting the coefficient Kso drawn with the solid line to be positive is increased while the area permitting the coefficient $K_D$ drawn with the dotted line to be positive is decreased. Therefore, in the case of the AAR as well as the AVR, the gain Kr has an optimum gain so that an attempt to broaden the stable operating area of the leading power factor is restricted to an extent. When comparing FIG. 4 with FIG. 5, it will be appreciated that, in the case of the AAR, the stable operating area enlarges in the region where the effective power output P is small.

In the AAR according to the present invention, it is attempt to enlarge the stable operating area in the region where the effective power area is small. The coefficient $K_D$ provides an obstacle to improvement of the stable operating area in the region of the small effective power P. That is, when the gain Kr is increased, the stable operating area is enlarged for the coefficient Kso, but it is reduced for the coefficient $K_D$. More precisely, whereas the increment of the gain Kr results in the increment of the coefficient Kso, as seen from the equation (15), the increment of the gain Kr results in correspondingly the reduction of the coefficient $K_D$ because negative is the third term in the equation (14) representing the effect of the AAR. The first term and the second term of the equation (14) is respectively obtained in conjunction with the blocks D and $K_4$ in FIG. 3. That the reduction of the coefficient $K_D$ follows the increment of the gain Kr will be described taking in connection with FIG. 6. In the phaser diagram in FIG. 6, $\Delta f$ component representing the damping torque and $\Delta \delta$ component representing the synchronizing torque meet at a right angle. One of the torque components created in the AAR, which is in phase with the ($\Delta f$) component serves to a positive damping torque while the other being in phase with the ($-\Delta f$) component serves as a negative damping torque. As seen from FIGS. 3 and 6, the output $\Delta Ef$ of the AAR lags the synchronizing torque component $\Delta \delta$ by $\theta_1$ due to a small time lag of the AAR. the field flux linkage $\Delta E'\phi$ through the AAR is retarded by $\theta_2$ for the output $\Delta Ef$ of the AAR due to the time lag of the field winding. Accordingly, the field flux component $\Delta E'\phi$ is retarded by about 90° for the synchronizing torque component $\Delta \delta$. The field flux component $\Delta E'\phi$ is substantially opposite to the damping torque $\Delta f$ in the phase and thus serves as the negative damping torque. The explanation of the reason why the third term including the gain Kr of the AAR in the equation (14) is negative, in terms of the phaser diagram, is as above mentioned. As apparent from the phaser diagram in FIG. 6, if a vector $\Delta E''\phi$ lies in the positive damping area, the third term in the equation (14) takes the positive sign. For this reason, in the AAR according to the present invention, the third term in the equation (14) is reduced by incorporating the leading power factor element into the AAR. That is, by giving the leading power factor element, such as $$\frac{1+T_2 S}{1+T_1 S},$$

provided that ($T_2 > T_1$), to the AAR, the lagging angle ($\theta_1 + \theta_2$) may be improved to ($\theta_1 + \theta_2 - \phi$), in which $\phi$ is the phase advancing angle caused by the phase advancing element of $$\left(\frac{1+T_2 S}{1+T_2 S}\right)^2.$$

Figure 7:
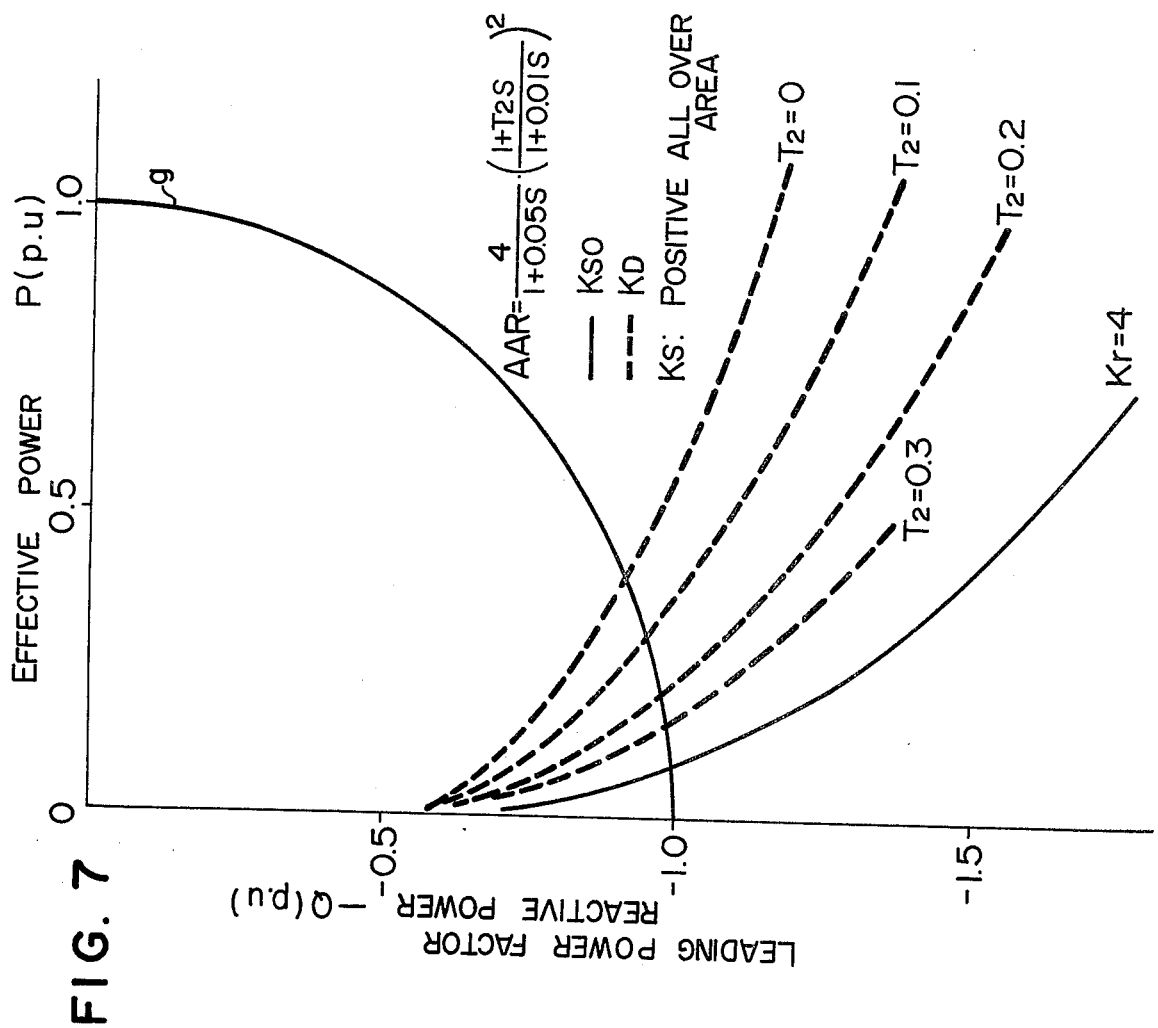
FIG. 7 is an output characteristic curves of the synchronous generator illustrating the threshold permitting the generator to stably operate, when the generator used employs the automatic angle regulator having phase advancing means.
Figure 6:
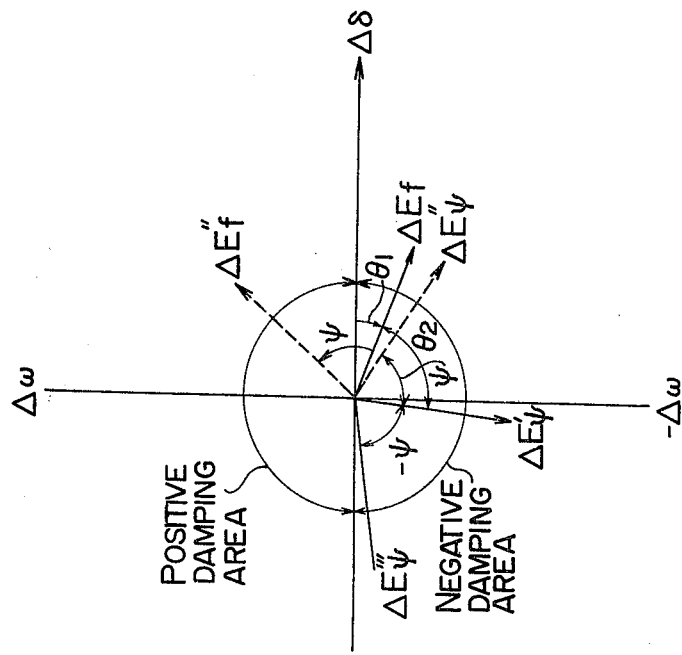
FIG. 6 is a phasor diagram for illustrating the reduction of damping torque when the gain of the automatic angular regulator is increased.

In FIG. 6, this is shown such that $\Delta Ef$ advances into $\Delta E''f$ while $\Delta E'p$ advances into $\Delta E''p$ those advance by $\phi$, respectively. Accordingly, if the selection is properly made of the time constants $T_1$ and $T_2$ of the phase advancing element, it is possible to cancel out the third term of the equation (14) and also to make it possitive. If the phase lagging element is employed in place of the phase advancing element, the similar effect may be attained. In this case, the vector $\Delta E'\phi$ rotates to $\Delta E'\lambda''\phi$. FIG. 7 shows the threshold curves permitting the generator to stably operate when the gain Kr of the AAR used in FIG. 5 is 4, and the AAR is compensately advanced in the phase. As will be apparent from the figure, the stable operating area is enlarged with the increment of the time constant $T_2$ of the phase advancing element. Particularly, that the condensive operating area is enlarged in the light load region (where the reactive power output P is small) is very useful when the phase advancing or condensive operation is practically carried out. In other words, it is impossible to operate at the area, corresponding to the area outside the circular arc curve g connecting the point of P = 1.0 to the point of Q = −1.0 with its center of the origin 0, in FIGS. 4, 5 and 7, capable of sufficing the relation $\sqrt{P^2 + Q^2} > 1$ in which P and Q are the effective power output and the reactive power output, respectively, and those are expressed in terms of the percent unit (P.U). In this condition, the electrical output from the generator is larger than the mechanical input to the generator so that the stable operation of the generator is impossible. The best way to enlarge the stable operating area is to enlarge it in the light load region. The stable operation of the synchronous generator has been described comparing the AVR with the AAR. It will be appreciated from the foregoing description that the AAR according to the present invention is the field excitation control system most adaptable for the condensive operation of the synchronous generator.

Figure 8:
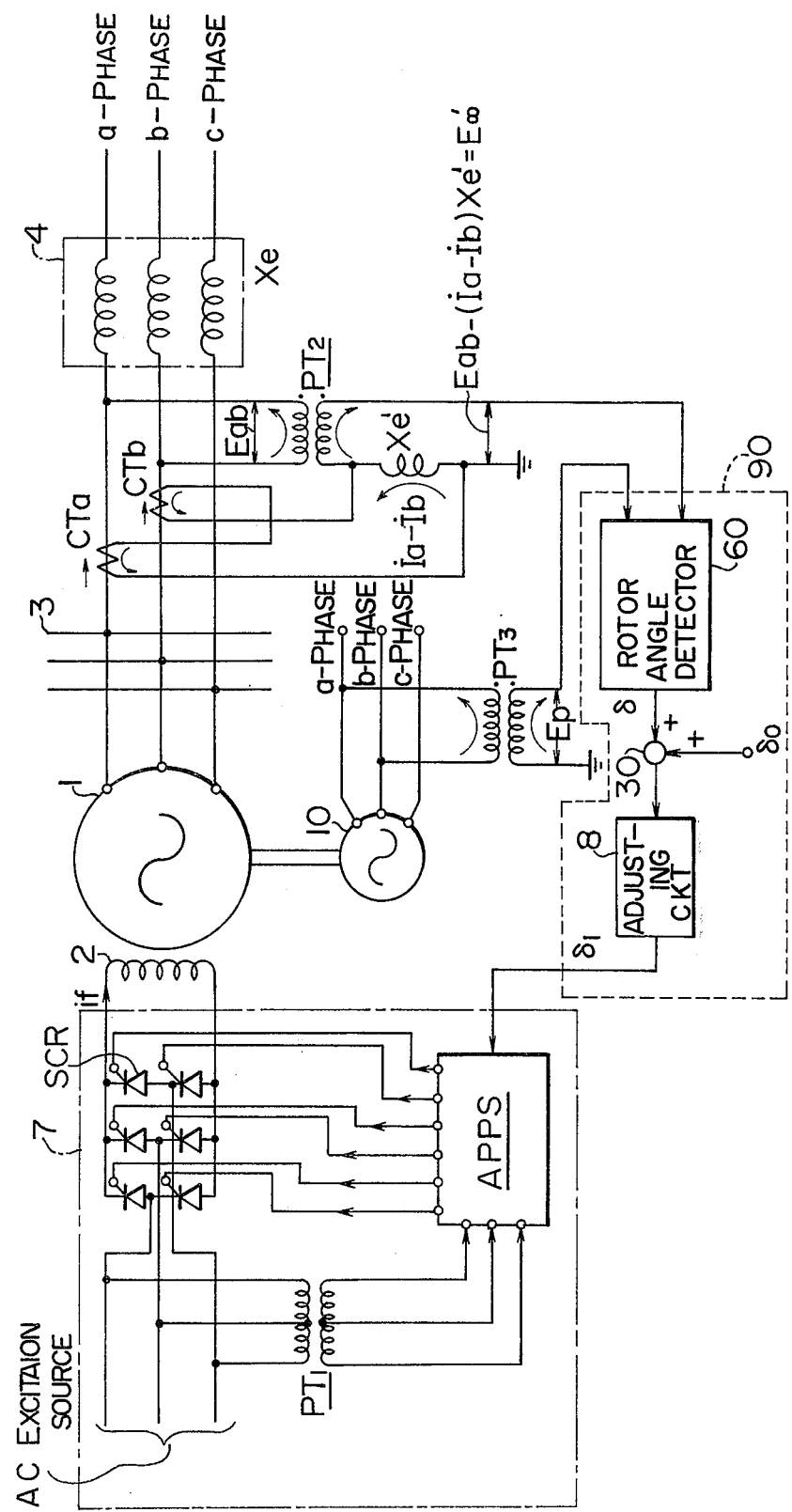
FIG. 8 is a schematic circuit diagram of the block diagram shown in FIG. 1.

A brief description of the AAR have been made referring to FIG. 1. A detail description of the AAR will next be made with reference to FIG. 8 illustrating the circuit diagram of the AAR. It is to be noted that the reference symbols designates the like parts or the equivalents in FIG. 1. The AAR is merely featured by receiving the rotor angle signal at the input terminal, and the field excitation circuit 7 is constructed in the same manner as the AVR. Accordingly, an explanation of this circuit will be made emphasizing the way to obtain the rotor angle.

In the figure, the excitation current $i_f$ flowing through the field winding 2 of a generator 1 is controlled by the field excitation circuit 7. The field excitation circuit 7 is comprised of a voltage transformer $PT_1$, silicon controlled rectifier (SCR), and an automatic pulse phase shifter (APPS) to control the operating point of the SCR employed, whereby the APPS serves to control the firing angle of the SCR in response to the input signal $\delta_1$ thereto, and an a.c. voltage is transformed into a d.c. voltage to the field winding 2. The a.c. voltage supplied from the voltage transformer $PT_1$ to the APPS is used to take a synchronization between the power output from an a.c. excitation source and the firing angle of the SCR. The APPS is commonly used in the AVR and the like, so that the explanation thereof will be omitted.

Figure 9A:
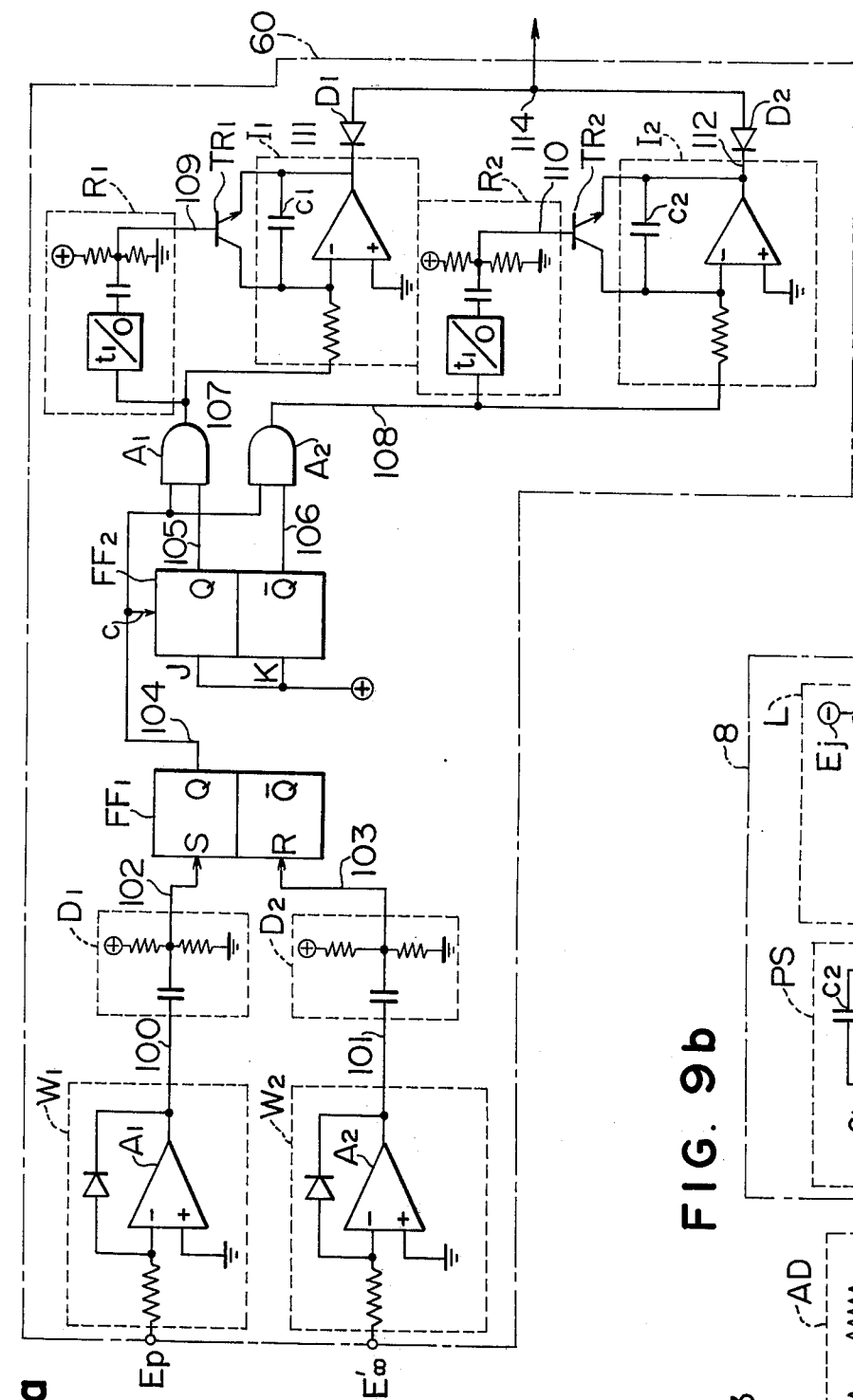
FIG. 9a and FIG. 9b are the circuit diagrams more specifically depicted of the major part of the schematic circuit diagram shown in FIG. 8.
Figure 9B:
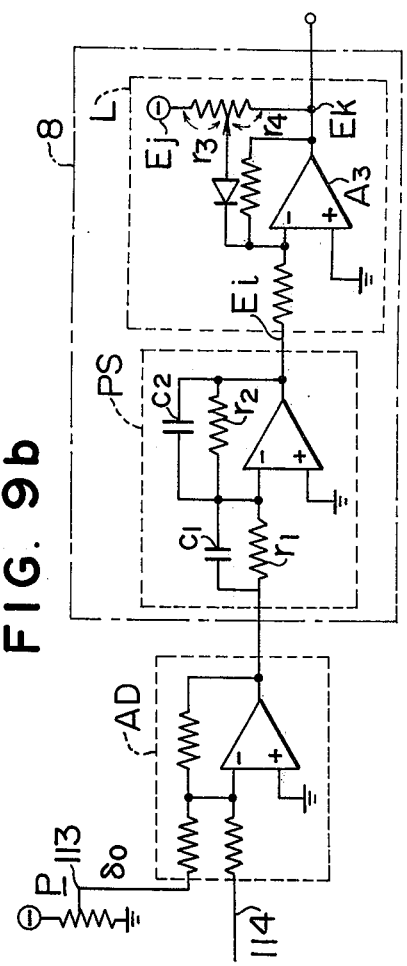
Figure 10:
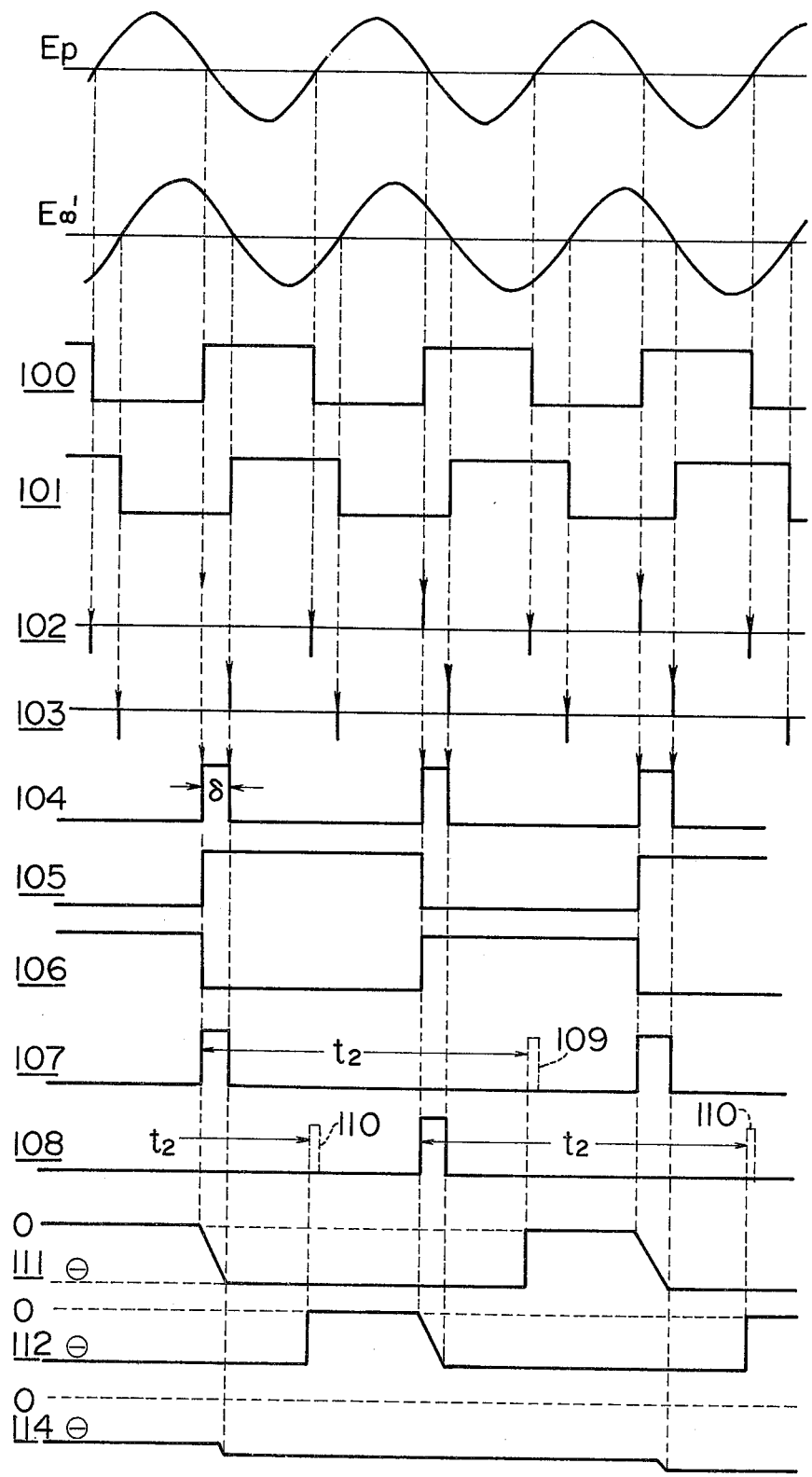
FIG. 10 is the wave forms appearing at the various sections in the circuit diagram of FIG. 9a and FIG. 9b.

On the other hand, the power output of the generator is supplied through the terminal 3 and the transmission line 4 to the large power system (not shown). Here the rotor angle δ indicates the phase difference between the internal induced electromotive force of the generator and the large power system voltage. However, it is difficult, as a practical matter, to obtain the two voltages from the remote places of several tens of kilometers to several hundreds of kilometers. For this, the difference voltage between the output terminal voltage of the generator and the voltage drop across the impedance Xe of the transmission line, is here treated to be equivalent to the large power system voltage. The terminal voltage of the generator instead of the large power system voltage may be employed. However, in this case, the change Δδ of the rotor angle δ is small so that it is undesirable to employ the terminal voltage of the generator. $PT_2$ is a voltage transformer provided close to the output terminal of the generator in order to draw, for example, the interphase voltage Eab between the phases $a$ and $b$. CTa and CTb are respectively a current transformer provided for the phase $a$ and one for the phase $b$. Xe' designates the impedance equivalent to one of the transmission line, through which the difference current (İa − İb) between the $a$ phase current İa and the $b$ phase current İb, flows. The output voltage from a rotor angle detector 60 which receives the voltage induced in the secondary winding of the voltage transformer $PT_2$ and the voltage across the impedance Xe' being in opposition to the former in the phase, is equivalent to the large power system voltage. The internal induced electromotive force may be the interphase voltage between the phase $a$ and the phase $b$ in the output voltage of the pilot generator 10 operating together with the generator 1 on a common rotating shaft. $PT_3$ is a voltage transformer. FIGS. 9a and 9b show the circuit constructions of the rotor angle detector 60, a summing means 30 and an amplifier 8. FIG. 10 illustrates the waveforms appearing at the various sections in the circuit diagrams in FIG. 9.

In FIG. 9, $W_1$ and $W_2$ designate the waveshaping circuits, respectively, and each of them is impressed at its input by the output voltage Ep of the pilot generator 10 corresponding to the internal induced electromotive force and the voltage E'∞ corresponding to the infinite bus voltage E∞. The respective waveshaping circuit, $W_1$ and $W_2$ serves to shape the input voltage, Ep and E'∞, at the time these voltages become positive into a rectangular wave, thereby obtaining the output signal 100 and 101. The operational amplifiers $A_1$, $A_2$ used in the wave-shaping circuits, $W_1$ and $W_2$ are of the saturation type. $D_1$ and $D_2$ are differential circuits, respectively, and produce pluses 102 and 103 when the output signals 100 and 101 rise and fall at a finite rate. FF1 is a set-reset type flip-flop circuit. When a rise impulse signal is applied to, for example, the set terminals $s$, the flip-flop produces a high level (hereinafter referred to as a logical level 1) at the output terminal Q, and a low level (hereinafter referred to as a logical level $o$) at the output terminal $\overline{Q}$. On the other hand, when a rise impulse signal is impressed to the reset terminal R, the output terminal Q and $\overline{Q}$ are inversed in the logical level, i.e. the output terminal Q is changed into $o$, and the terminal $\overline{Q}$ is changed into 1. The output signal 102 is impressed to the input terminal $s$ of the flip-flop FF1 while the output signal 103 is impressed to the input terminal R thereof. Accordingly, the logical level 1 appears at the output terminal Q of the flip-flop FF1 during the period from when the pilot generator output voltage Ep becomes positive until the voltage E'∞ becomes positive. FF2 is a J–K flip-flop, whose input terminals are coupled with the positive current source, and whose clock pulse terminal C is connected to the output of the flip-flop FF1. The clock pulse terminal C has a differential function so that the output terminals Q and $\overline{Q}$ are not inversed in the level until the input signal applied to the terminal C rapidly changes, for example, the input signal rapidly changes from the low level $o$ to the high level 1. Accordingly, the output signal 105 appearing at the terminal Q of the flip-flop FF2 is kept 1 during a period from when the pilot generator output voltage Ep goes to negative until the voltage Ep goes to negative again and then, at the following period, the output signal 106 of the other output terminal $\overline{Q}$ is kept the level 1. An AND circuit $A_1$ performs the AND operation of the output signals 104 and 105. An AND circuit $A_2$ carries out the AND operation of the output signals 104 and 106. The thus constructed circuitry permits the output signal 104 of the flip-flop FF1 to be alternately supplied into the AND circuits $A_1$ and $A_2$. In other words, if the rotor angle δ obtained at the first period appears in the AND circuit $A_1$ the rotor angle δ at the second period appears in the AND circuit $A_2$, and the rotor angle δ at the third period again appears in the AND circuit $A_1$. The integrators $I_1$ and $I_2$ serve to integrate the input signals 107 and 108, respectively. The reset circuits $R_1$ and $R_2$ for the integrators $R_1$ and $R_2$ operates such that the transistors $TR_1$ and $TR_2$ driven provide short circuits to the capacitors $C_1$ and $C_2$, respectively. The respective circuit, $R_1$ and $R_2$, comprises a differential element and a timer operable with a time-limit operation. The time interval until the timer starts to operate is selected to be longer than one period but less than two periods. As a result, the output signal of the integrator may be maintained for at least one period from the time the integrator commences its operation. The outputs of the integrators $I_1$ and $I_2$ are shown in FIG. 10 with the wave forms numbered 111 and 112. The low value gate including the diode $D_1$ and $D_2$ serves to permit the smaller value 114 of the two outputs 111 and 112 to be fed to the summing amplifier AD. the summing amplifier AD also is coupled with the output 113 of the potentiometer P. The output 113 is used to set the rotor angle δ to be $δ_o$. The sum of the rotor angle δ (signal 114) and the set signal $δ_o$ appears at the output of the summing amplifier. Unlike the case of the AVR, that the field excitation current of the synchronous generator is determined by the summing signal of the set signal $δ_o$ and the fed back signal of the rotor angle δ, and is important from the aspect of the construction of the AAR. PS designates a phase advancing circuit, which may include plural stages, if necessary. The threshold characteristic curve in FIG. 7 is illustrated employing two phase advancing circuits, with $T_2$ being the product of the resistor $r_1$ and the capacitor $C_1$, and with the product of 0.01 second of the resistor $r_2$ and the capacitor $C_2$. That the provision of the phase advancing circuit brings about a greater enlargement of the leading power factor load area is described with reference to FIGS. 7 and 8. However, it is evident from FIG. 6 that if it is attempted solely to enlarge the leading power factor load area merely by increasing the electrical torque, selection is not restricted to the phase advancing element alone. That is, the phase of the field excitation flux change $\Delta E'\phi$ may be retarded in order to displace the vector of $E'\phi$ into the positive damping area. To accomplish this, the phase advancing circuit PS in FIG. 9 must be designed so as to satisfy the relation $C_1 \times r_1 > C_2 \times r_2$. In this case, the response in the excitation control system is delayed. The limiter L prevents the output Ei of the phase advancing circuit PS from growing exceedingly. That is, if the too extensive excitation is applied to the generator, the field winding thereof will be deteriorated or burned. For this, it is necessary to restrict the output voltage Ei to a predetermined value. The L is comprised of a well known limiter circuit. For example, the output voltage Ek of the operational amplifier $A_3$ is expressed $0 \leq Ek \leq 8.2$, and thus the voltage Ek is restricted to be less than or equal to 8.2, provided that the output voltage Ei is $-10 \leq Ei \leq 0$, $Ej = -10(u)$, and $r4/r3 = 9/11$. The field excitation control system according to the present invention has the construction as described above.

It can be seen from the foregoing description that the AAR according to the present invention useful particularly in the condensive operation, and it may readily be reduced into practice without any trouble since the technique in the AVR may be applicable.

Many modifications of the disclosure will be apparent to those skilled in the art for practicing the advantages of the invention which is defined by the appended claims.

We claim:

1. A field excitation control system of the synchronous generator comprising:
   a synchronous generator including a field winding;
   rotor angle detector means to detect the rotor angle of the synchronous generator;
   rotor angle setting means to provide a set value of the rotor angle;
   summing means to sum the output of said rotor angle detector means and the output of said rotor angle setting means;
   phase regulating means for regulating the phase of the output of said summing means; and
   field excitation voltage control means to control the terminal voltage of the field winding of the synchronous generator in response to the phase-regulated output of said summing means.

2. A system as claimed in claim 1 wherein said phase regulating means includes phase advancing means to advance the phase of the output of said summing means, said phase advancing means being provided between said summing means and field excitation voltage control means.

3. A system as claimed in claim 1, wherein said phase regulating means includes phase lagging means to delay the output of said summing means, said phase lagging means being provided between said summing means and said field excitation voltage control means.

4. A system as claimed in claim 1, further comprising a limiter to prevent the output of said summing means from exceeding a predetermined value, which is provided between said summing means and said field excitation voltage control means.

5. A system as claimed in claim 2, further comprising a limiter to prevent the output of said phase advancing means from exceeding a predetermined value, which is provided between said phase advancing means and said field excitation voltage control means.

6. A system as claimed in claim 3, further comprising a limiter to prevent the output of said phase lagging means from exceeding a predetermined value, which is provided between said phase lagging means and said field excitation voltage control means.

* * * * *